Nov. 16, 1926.
W. A. MURPHY
ADDING DEVICE
Filed Feb. 4, 1926
1,607,294
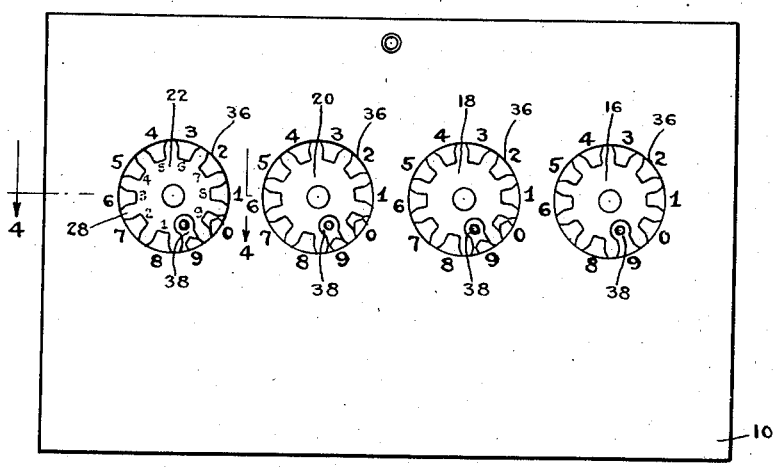
Fig-1
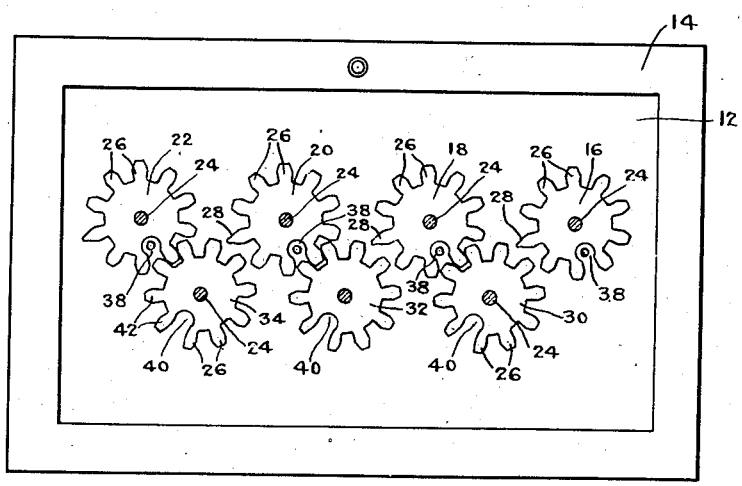
Fig-2
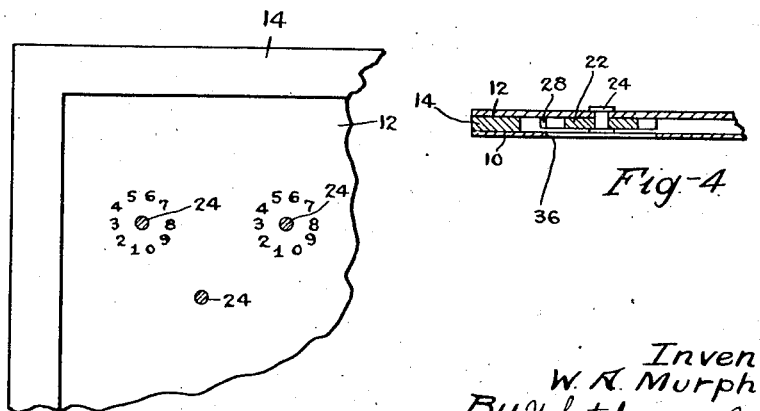
Fig-3
Fig-4
Inventor:
W. A. Murphy.
By Whiteley and Ruckman
Attorneys.

Patented Nov. 16, 1926.

1,607,294

UNITED STATES PATENT OFFICE.

WALTER A. MURPHY, OF ST. PAUL, MINNESOTA, ASSIGNOR TO KENNETH E. KELLEY, AND GORDON KISSOCK, BOTH OF MINNEAPOLIS, MINNESOTA.

ADDING DEVICE.

Application filed February 4, 1926. Serial No. 85,940.

My invention relates to adding devices and more particularly to devices of this character having a plurality of indicator gears and a plurality of carrier gears, the latter functioning between the respective indicator gears for transmitting at the proper time, the motion of one of the indicator gears to another. An object is to provide a device of the character stated which is thoroughly reliable for use in adding numbers and at the same time is compact and simple in construction with attendant economy in manufacture.

The full objects and advantages of my invention will appear in connection with the detailed description thereof, and the novel features embodied in my inventive idea will be particularly pointed out in the claims.

In the accompanying drawings which illustrate a practical embodiment of my invention,—

Fig. 1 is a plan view of the device. Fig. 2 is a plan view showing the device after the front plate has been removed. Fig. 3 is a fragmentary plan view showing the inner surface of the back plate after the gears have been removed. Fig. 4 is a view in section on the line 4—4 of Fig. 1.

As shown in the drawings, I provide a casing having a front plate 10 and a back plate 12 which are held in spaced relation by an interposed strip 14 around the margin as shown in Fig. 4. Between the plates 10 and 12 are mounted rotatable spur gears 16, 18, 20 and 22 any desired number of which may be employed according to the capacity which is to be given the device and which stand respectively for units, tens, hundreds and thousands. These gears may be referred to as indicator gears and are made from comparatively thin material such as sheet metal or celluloid by stamping. They are rotatably secured to the back plate 12 by rivets 24 which are so spaced from each other that none of the teeth of any one gear in the set engage those of another. Each of these gears has ten radially extending teeth, nine of which indicated by the numeral 26 are alike or equal to each other, the other tooth indicated by the numeral 28 being elongated. In the embodiment shown having four indicating gears, three similar gears 30, 32 and 34 are also rotatably secured to the back plate 12 by rivets 24. These latter gears may be referred to as carrier gears and are the same as the indicator gears except that the long tooth 28 of the latter is cut down so that all ten teeth of the carrier gears are alike and hence all designated by the numeral 26. The carrier gears are placed below the indicator gears and in staggered relation thereto as shown in Fig. 2. The teeth of the carrier gears mesh with those of the indicator gear which is to the left, but there is no meshing with the teeth of the indicator gears which are to the right except by means of the one long tooth 28 of the latter. The front plate 10 is provided with circular apertures 36, there being one in front of each of the indicator gears so as to expose the latter. A circular series of numbers ranging from 0 to 9 is placed on the inner surface of the back plate as shown in Fig. 3. There is one of these series beneath each of the indicator gears and all except one number of the series is always covered by the superposed gear. In order to expose the proper one of the numbers, the indicator gears are each provided with a rounded notch 38. In Fig. 1, the zero is shown exposed through the notch in connection with each of the indicator gears, this being the initial position in which the device is set. It will be noted that this series of numbers progresses in clockwise direction. Another circular series of numbers arranged from 0 to 9 is placed on the outside of the front plate. There is one of these series arranged around the margin of each of the apertures 36 and this series of numbers progresses in counterclockwise direction. The number 9 of the outer series is adjacent the figure 0 of the inner series so that the two adjacent numbers of the outer and inner series always total 9 as may be seen at the left end of Fig. 1, in which the inner concealed numbers are indicated in dotted lines. Each of the carrier gears is provided with a rounded notch 40 which is similar to the notch 38 of the indicator gears. The notch 40 is adapted to receive at the proper time the elongated tooth 28 of the intermeshing indicator gear. This may be seen by referring to Fig. 2 from which it will be noticed that the notch 40 of the gear 30 is adapted to receive the tooth 28 of the gear 18 at the proper time. So far as the gears 30 and 18 are concerned, the tooth 28 in effect acts the same as any of the other nine teeth of the gear 18, but comparing the gears 18 and 32, it will be observed that for each complete rotation of the gear 18 there will be one-tenth of a rotation of the gear 32. The same relationship exists between the gears 16 and 30 and so on for the other cooperating gears. The manner in which the gears provided with the teeth 26 and the elongated teeth 28 are formed and arranged constitutes an important feature of the device. In the first place, it will be obvious that since all of these teeth extend out radially from the body of the gear, the back and front plates may both have perfectly flat surfaces and the space between them need be only sufficient to accommodate the thin flat gears which are mounted for rotation in a common plane. This results in economy in the manufacture of the device. This result is also aided by the fact that the gears if desired may all be stamped out by the same die. To produce the carrier gears from the indicator gears, it is only necessary to cut off the end of the elongated tooth 28 and to widen out the entrance to the notches. The notches 38 of the indicator gears are otherwise like the notches 40 of the carrier gears and are disposed in the same position although the notches have different functions for the two sets of gears. By referring particularly to Fig. 2, it will be seen that the teeth 26 as indicated at the left of this figure have similar beveled surfaces 42 on opposite sides toward their outer ends. This causes the engaging teeth of two intermeshing gears to glide smoothly past each other and disengage at exactly the proper time. The base portion of the elongated tooth 28 is exactly like any one of the teeth 26 but the converging sides are continued until they meet each other.

In the operation of the device, all of the indicator disks are initially set so that the 0 of each of the inner series of numbers is exposed through the notches 38. In order to add numbers, the point of a pencil or the end of any suitable rodlike article is placed between the teeth 26 of the proper indicator gear and adjacent the desired digit in the outer series, and the gear is rotated to the right until the selected digit is adjacent the zero of the outer series whereupon the same digit that was selected will appear for the inner series exposed through the notch 38. For example, if the first of the numbers to be added is 1,538, the thousands gear 22 is turned one space, the hundreds gear 20 is turned five spaces, the tens gear 18 is turned three spaces and the units gear 16 is turned eight spaces. When the device has been manipulated in this manner for all of the numbers to be added, the total will appear exposed on the back plate through the various notches 38. My device will be used for adding numbers for various purposes such as keeping a record of the amount of household expenditures and keeping the score of games, such for instance, as bridge.

I claim:

1. In an adding device, the combination of two indicator gears and a carrier gear mounted for rotation in a common plane and having radially extending teeth, said carrier gear having its teeth constantly in mesh with the teeth of one of said indicator gears and the other of said indicator gears having one elongated tooth for engaging the teeth of said carrier gear.

2. In an adding device, the combination of two indicator gears and a carrier gear mounted for rotation in a common plane and having radially extending teeth, said carrier gear having its teeth constantly in mesh with one of said indicator gears and being provided with a notch, each of said indicator gears having one elongated tooth, the elongated tooth of the indicator gear with which the carrier gear is in constant mesh being adapted to be received in the notch of the carrier gear, the elongated tooth of the other indicator gear being adapted to engage a tooth of the carrier gear once for each rotation of said last mentioned indicator gear.

In testimony whereof I hereunto affix my signature.

WALTER A. MURPHY.